Aug. 23, 1932.  J. D. MORGAN  1,873,014
PROCESS OF MAKING HIGH TEMPERATURE INSULATING PRODUCTS
Filed Dec. 16, 1930
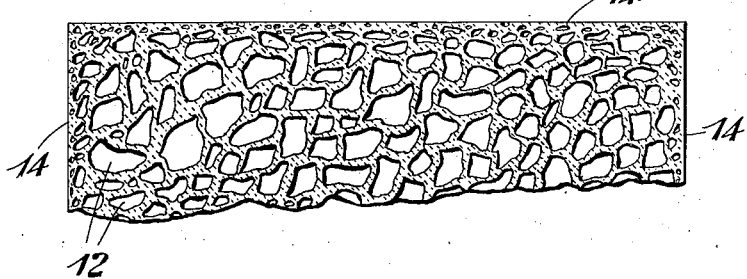
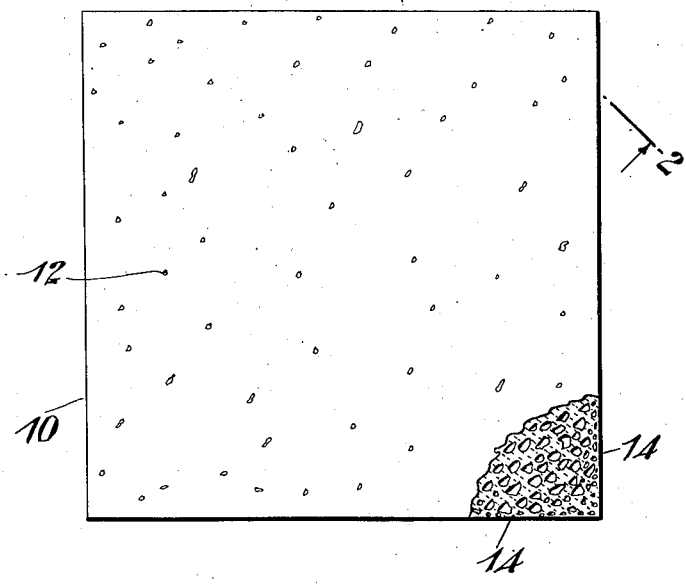
Inventor
JOHN D. MORGAN
By his Attorney Patented Aug. 23, 1932

1,873,014

UNITED STATES PATENT OFFICE

JOHN D. MORGAN, OF SOUTH ORANGE, NEW JERSEY, ASSIGNOR TO DOHERTY RESEARCH COMPANY, OF NEW YORK, N. Y., A CORPORATION OF DELAWARE

PROCESS OF MAKING HIGH TEMPERATURE INSULATING PRODUCTS

Application filed December 16, 1930. Serial No. 502,712.

This invention is a continuation in part of the application of John D. Morgan, Serial No. 286,831, filed June 20, 1928.

The present process relates to the art of heat insulation. It is often desired to insulate furnaces and like apparatus against the loss of heat. The material used for this purpose should be refractory and should have a high strength under compression at high temperature. It is desirable also that the material be at the same time of light weight.

The principal object of the present invention is to provide a product fulfilling the above requirements, and a method of making the same.

The product according to the present invention is a refractory containing a relatively large percentage of voids and at the same time possessing relatively high crushing strength at 2500° F. It is made of a refractory aggregate, a small amount of pulverulent metal, and a bond capable of generating a gas when in contact with said metal. It will be understood that these ingredients do not always appear in the final product. The refractory aggregate may be of any of the well-known materials now known to be capable of resisting high temperatures. The porosity of the final product is due to the fact that the bonding material in part reacts with the small amount of metal to generate a gas. These gases which are generated before the refractory aggregate has set in its final form and while it is still in a plastic condition, expand, and inflate the same in a manner analogous to the action of yeast in bread dough to give the final product a light, porous structure.

In the manufacture of porous refractory materials, wherein batches in large quantities are made according to the above process considerable haste must be used to dry the resulting product within a short time after its preparation since the bonding material, water and metal present in the mixture react to cause evolution of gases and cause inflation of the mixture before the time of heat treatment. By the time the batch is ready for heat treatment, most of the gases will have escaped with the result that the final product is not so porous as desired.

It is a further object of this invention to avoid these difficulties.

To this end it is a feature of this invention to add a colloid, such as collodion, gum arabic, glue, resins, or other readily adhesive substance which will decompose at relatively low temperature and will adhere to and coat the pulverulent metallic materials used in the composition to make the refractory material. The use of the colloid forms a protective coating on the particles of the metal to retard the reaction between the metallic particles and the bonding material until the desired time. At such time when the reaction between the bond, water, and the pulverulent metal is desired, the protective structure of the colloid will break down at low temperatures and release the metallic material, thus exposing it to the action of the bonding agent, such as phosphoric acid, and the water. In this manner, therefore, when batches of refractory material are ready for heat treatment the colloid will protect the particles of the metal from the chemical action of the phosphoric acid in water until the desired time, without any substantial rising action occurring in the composition.

Other objects and advantages of the present invention will be apparent to those skilled in the art from the following description taken in conjunction with the accompanying drawing, in which Fig. 1 is a plan view of a square block illustrating the forms and structure of the preferred heat insulating material.

Fig. 2 is a section of the insulating block on an enlarged scale taken on the line 2—2 of Fig. 1 and looking in the direction of the arrows.

In the drawing, 10 is a block of refractory containing a large number of cells or holes 12 of various sizes. The walls of cells 12 are preferably of small grains of zircon bonded by phosphates non-volatile at the temperatures to which the refractory product is to be subjected.

The product embodying the present invention is preferably produced in molds and the block 10 will be understood to be an illustration of a block according to the present invention which has been molded in a square mold. When molded, a skin 14 forms on the outer surface of the product so that most of the cells in the product where adjacent the surface are covered. This fact prevents transfer of heat through the product by convection. It will be noted that few of the cells 12 appear at the surface of block 10 in Fig. 1, the greater majority of the cells adjacent the surface of the block being covered by the skin 14.

An example of the ingredients of a composition used in making the present product is as follows: native zircon sand, or a mixture of native zircon sand and milled zircon, is mixed with approximately 1% of the powder of aluminum, 15% of powdered sulfur or flowers of sulfur, and 6% of $P_2O_5$ which is preferably half in the form of $H_3PO_4$ and half as $(NH_4)_2 HPO_4$ in aqueous solution. The percentages just given are by weight. The ingredients as stated are mixed together forming a wet mixture. Where the aggregate must stand for a considerable period in the wet mixed state, the powdered particles of aluminum are coated with a colloid such as glue, as previously described.

Any of the common metals, or their alloys, may be substituted for the aluminum, it being necessary only that the metal or metallic substance develop a gas when in contact with the bond. Zinc, magnesium, and their alloys have been used, but are not as convenient as aluminum. The metal in a finely pulverulent state, under the conditions previously mentioned, is mixed with the colloid such as glue, to which water is added with constant stirring, to form a suspension of the pulverulent metal particles in the glue. The glue coats the metal particles after which they are unaffected by the presence of the phosphoric acid in the mixture at ordinary temperatures. The sulfur may be omitted or may be replaced by any ordinary combustible material to generate gases. If the acid is all in the form of $H_3PO_4$, it is preferable to reduce the $P_2O_5$ contents of the mixture to 5%. The phosphate reaction product of the aluminum has been found to act as a bond in the final product with the phosphate reaction products of the zircon, or other refractory. The mixture is shaped or molded and fired to a temperature of from 500° to 700° F. As the temperature of the mixture or composition rises during firing, the glue is destroyed and the metal particles exposed to the chemical action of the phosphoric acid, while the sulfur vaporizes and oxidizes, which actions tend to produce comparatively large volumes of vapors and gases.

At the temperature at which these vapors and gases are formed, the mixture is still plastic, and has acquired, due to the characteristic of the bond, an elasticity or adhesiveness, somewhat analogous to bread dough, so that the mass swells and becomes highly cellular. As the temperature rises further, the bond sets and the walls of the cells become rigid so that the final product has a considerable crushing strength, but owing to its high percentage of voids also has a high insulating capacity or resistance to heat flow. As the product is intended to withstand high temperature, it is preferred that it be fired to at least 2500° F. However, the product when bonded by phosphoric acid has a firm set at approximately 500° F. and a final set at approximately 700° F. The product therefore need not be fired beyond 700° F. The swelling and formation of cells in the product therefore occurs below 500° F., but not at ordinary temperatures due to the protective action of the material coating the metal particles.

It is understood that a bond with basic characteristics may be substituted for the acid bond given in the previous example, without departing from the spirit and scope of this invention.

It is well known to use insulating materials for preventing the loss of heat from furnaces and like structures. Diatomaceous earth, kieselguhr, and the like have been used for this purpose. A brick made as described in the above example when tested at 2500° F. was found to have a static load strength under compression of more than 40 pounds and an average of sixty pounds per square inch.

The product according to the present invention is substantially non-dusting and non-spalling and slags very little when in contact with the ordinary fuels and furnace charges. The high percentage of voids in the product of the present invention is indicated by the fact that the zircon material bonded by known means has a weight approximately 160 to 180 pounds per cubic foot, whereas the product of the process according to the above example has a weight of only 75 pounds per cubic foot. A specimen of the product of the present invention has been found to have over 60% of voids when tested by the specific gravity method.

When the colloidal material or other retarder is used to prevent immediate chemical reaction between the metal and the phosphoric acid, the mixture has the further advantage that large batches of material can be made up and placed in molds without the rising action taking place until the desired time when suitable temperatures are applied.

Although there has been herein described but a single preferred form of the invention, it will be understood that various modifications may be made by those skilled in the art in the proportions and composition of the ingredients of the refractory aggregate without departing from the scope of the present invention. Having thus described the invention, what is claimed as new is:

1. The method of making highly porous refractory which comprises treating a wet mixture containing by weight 1% of a powdered metal, the particles of which are coated with colloidal material, 15% of sulfur, 6% of $P_2O_5$ or its equivalent and the balance zircon sand at 500° to 700° F. and firing the resulting mass to a temperature of at least 2500° F.

2. The process of making highly porous refractory which comprises coating particles of a powdered metal with a layer of material in colloidal suspension and adding them to a batch of refractory aggregate containing a bonding agent, molding the resulting mixture into desired shape and firing the same at a temperature sufficient to decompose the layer of material in colloidal suspension coating the powdered metal prior to the setting of said aggregate.

3. The method of making refractory material which comprises coating pulverulent metal particles with an organic material, adding the same to a batch of refractory aggregate containing substantially 78% of zircon and a bonding agent, and heating the mixture to decompose the organic material at relatively low temperatures to allow chemical action between the metal and the bonding agent.

4. A method of making a high strength cellular heat insulating refractory including mixing a refractory aggregate and acidic bonding agent in solution and capable of imparting to the mixture adhesiveness and plasticity and a metallic pulverulent substance enclosed in an organic coating adapted to prevent a reaction between the metallic substance and the acidic bonding agent at ordinary temperatures, molding and developing a gas in the mixture by decomposing said coating to permit chemical reaction between the bonding agent and the pulverulent metal.

5. The method of making a high strength cellular heat insulating refractory, including mixing zircon with approximately 1% of powdered aluminum metal, 15% flowers of sulfur and 6% $P_2O_5$ in aqueous solution, and shaping and firing the mixture.

6. The method of making a high strength cellular heat insulating refractory comprising mixing a refractory aggregate with 1% aluminum powder in suspension in a colloidal solution of an organic material and with a compound of $P_2O_5$ in aqueous solution and firing the mixture.

7. The process of making a highly porous refractory which comprises coating particles of a powdered metal with a layer of adhesive material and adding the same to a batch of refractory aggregate containing a bonding agent capable of generating a gas when in contact with said metal, molding the resulting mixture into the desired shape and firing the same at a temperature sufficient to decompose the layer of adhesive material coating the powdered metal prior to the setting of said aggregate.

In testimony whereof I affix my signature.

JOHN D. MORGAN.